United States Patent
Stuebs et al.

(10) Patent No.: US 12,206,136 B2
(45) Date of Patent: Jan. 21, 2025

(54) CELL CONNECTOR STRUCTURE, RECHARGEABLE BATTERY PACK AND GARDENING AND/OR FORESTRY WORK SYSTEM

(71) Applicant: Andreas Stihl AG & Co. KG, Waiblingen (DE)

(72) Inventors: Gerhard Stuebs, Korb (DE); Sebastian Schenk, Pluederhausen (DE); Denis Ehrler, Wernau (DE); Alexander Nordmann, Stuttgart (DE); Joachim Kolb, Ludwigsburg (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 0 days.

(21) Appl. No.: 16/723,295

(22) Filed: Dec. 20, 2019

(65) Prior Publication Data

US 2020/0220144 A1    Jul. 9, 2020

(30) Foreign Application Priority Data

Jan. 7, 2019    (EP) ..................... 19150509

(51) Int. Cl.
*H01M 50/522* (2021.01)
*H01M 10/48* (2006.01)
(Continued)

(52) U.S. Cl.
CPC ....... *H01M 50/522* (2021.01); *H01M 10/482* (2013.01); *H01M 50/503* (2021.01);
(Continued)

(58) Field of Classification Search
CPC .. H01M 50/20; H01M 50/213; H01M 50/502; H01M 50/531; H01M 10/486;
(Continued)

(56) References Cited

U.S. PATENT DOCUMENTS 7,604,507 B1 * 10/2009 Millon ................ H01M 50/502
439/627
2009/0022206 A1    1/2009 Shibuya et al.
(Continued)

FOREIGN PATENT DOCUMENTS

CN    103563122 A    2/2014
CN    104241582 A    12/2014
(Continued)

OTHER PUBLICATIONS

"Interlock." Merriam-Webster.com Dictionary, Merriam-Webster, https://www.merriam-webster.com/dictionary/interlock. Accessed May 7, 2021. (Year: 2021).*

(Continued)

*Primary Examiner* — Matthew T Martin
*Assistant Examiner* — Grace Ann Kenlaw
(74) *Attorney, Agent, or Firm* — Crowell & Moring LLP

(57) ABSTRACT

A cell connector structure is provided for a rechargeable battery pack that supplies electrical drive power to an electrically driven gardening and/or forestry work appliance. The cell connector structure has: a plurality of cell connectors, wherein the cell connectors are designed for electrically connecting rechargeable battery cells, at least one cell connector element, wherein the cell connectors and the at least one cell connector element are designed for being arranged on one another and for being secured against becoming detached from one another, a plurality of voltage tap elements, wherein the voltage tap elements have voltage tap cables, wherein the voltage tap cables are designed for being electrically connected to the cell connectors, and at least one tap element body, wherein the voltage tap elements and the at least one tap element body are designed for being arranged on another and for being secured against becoming detached from one another. The at least one cell connector (Continued)

element with the cell connectors and the at least one tap element body with the voltage tap elements are designed for being mechanically connected to one another.

20 Claims, 10 Drawing Sheets

(51) Int. Cl.
*H01M 50/213* (2021.01)
*H01M 50/503* (2021.01)
*H01M 50/516* (2021.01)

(52) U.S. Cl.
CPC ........ *H01M 10/486* (2013.01); *H01M 50/213* (2021.01); *H01M 50/516* (2021.01)

(58) Field of Classification Search
CPC ...... H01M 10/482; H01M 2/202; H01M 2/22; H01M 2/26; H01M 2200/30
See application file for complete search history.

(56) References Cited

U.S. PATENT DOCUMENTS

| | | |
|---|---|---|
| 2009/0111015 A1 | 4/2009 | Wood et al. |
| 2009/0130545 A1 | 5/2009 | Wood et al. |
| 2010/0028723 A1 | 2/2010 | Haba |
| 2010/0255355 A1 | 10/2010 | Park et al. |
| 2010/0320969 A1 | 12/2010 | Sakakibara et al. |
| 2011/0177372 A1 | 7/2011 | Maguire et al. |
| 2012/0009446 A1 | 1/2012 | Mizuguchi |
| 2013/0011706 A1 | 1/2013 | Wood et al. |
| 2013/0337299 A1* | 12/2013 | Sugawara ............ H01M 10/482 429/61 |
| 2014/0227570 A1 | 8/2014 | Hoshi et al. |
| 2015/0010808 A1 | 1/2015 | Shoji |
| 2015/0050532 A1 | 2/2015 | Waigel et al. |
| 2015/0056483 A1 | 2/2015 | Ogasawara et al. |
| 2015/0132634 A1 | 5/2015 | Sera et al. |
| 2015/0255773 A1 | 9/2015 | Yoshinari et al. |
| 2015/0303435 A1 | 10/2015 | Ikeda et al. |
| 2016/0049703 A1* | 2/2016 | Lobert .............. H01M 10/6551 429/62 |
| 2016/0197383 A1* | 7/2016 | DeKeuster ........ H01M 10/6551 429/90 |
| 2016/0301049 A1* | 10/2016 | Zhu ..................... H01M 10/658 |
| 2016/0315359 A1 | 10/2016 | Tyler et al. |
| 2017/0194771 A1 | 7/2017 | Aoki |
| 2018/0364108 A1 | 12/2018 | Tanaka et al. |
| 2018/0366846 A1* | 12/2018 | Matsunaga ......... H01M 50/569 |
| 2019/0020012 A1* | 1/2019 | Ju ....................... H01M 50/211 |

FOREIGN PATENT DOCUMENTS

| | | |
|---|---|---|
| CN | 107004792 A | 8/2017 |
| CN | 107290072 A | 10/2017 |
| CN | 108012571 A | 5/2018 |
| CN | 108645525 A | 10/2018 |
| CN | 109100038 A | 12/2018 |
| DE | 20 2010 012 151 U1 | 11/2010 |
| DE | 10 2012 209 174 A1 | 12/2013 |
| DE | 10 2015 206 750 A1 | 10/2015 |
| JP | 2011-108379 A | 6/2011 |
| JP | 2015-201363 A | 11/2015 |
| JP | 2016-72181 A | 5/2016 |
| JP | 2017-58183 A | 3/2017 |
| JP | 2018-159656 A | 10/2018 |
| JP | 2019-212531 A | 12/2019 |
| WO | WO 2007/050265 A1 | 5/2007 |
| WO | WO 2008/038916 A1 | 4/2008 |
| WO | WO 2016/171783 A1 | 10/2016 |

OTHER PUBLICATIONS

Lexico Dictionaries. (2021). Cable English definition and meaning. Lexico Dictionaries | English. Retrieved Nov. 10, 2021, from https://www.lexico.com/en/definition/cable. (Year: 2021).*

European Search Report issued in counterpart European Application No. 19150504.9 dated Jul. 29, 2019 with partial English translation (nine (9) pages).

European Search Report issued in counterpart European Application No. 19150509.8 dated Jul. 29, 2019 with partial English translation (10 pages).

European Search Report issued in counterpart European Application No. 19150519.7 dated Jun. 17, 2019 with partial English translation (10 pages).

English translation of document B4 (JP 2011-108379 A filed on Dec. 20, 2019) 31 pages.

U.S. Office Action issued in U.S. Appl. No. 16/723,282 dated May 23, 2022 (24 pages).

Chinese-language Office Action issued in Chinese Application No. 201911396771.6 dated May 26, 2023 with partial English translation (15 pages).

Chinese-language Office Action issued in Chinese Application No. 201911396713.3 dated Dec. 28, 2022 (eight (8) pages).

U.S. Non-Final Office Action issued in U.S. Appl. No. 16/723,282 dated Nov. 6, 2023 (18 pages).

U.S. Non-Final Office Action issued in U.S. Appl. No. 16/723,282 dated Apr. 25, 2023 (29 pages).

* cited by examiner

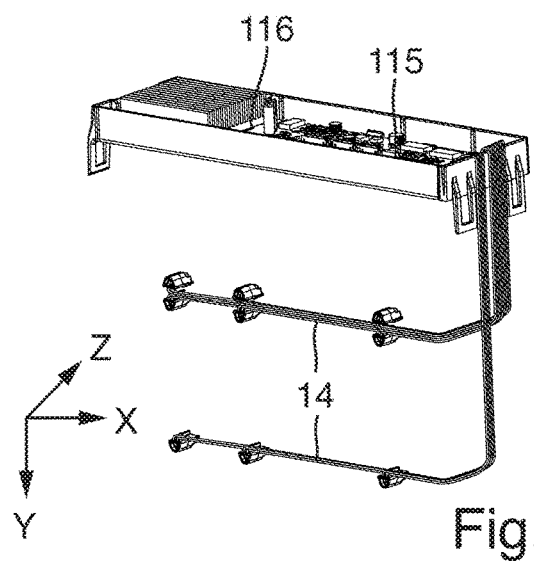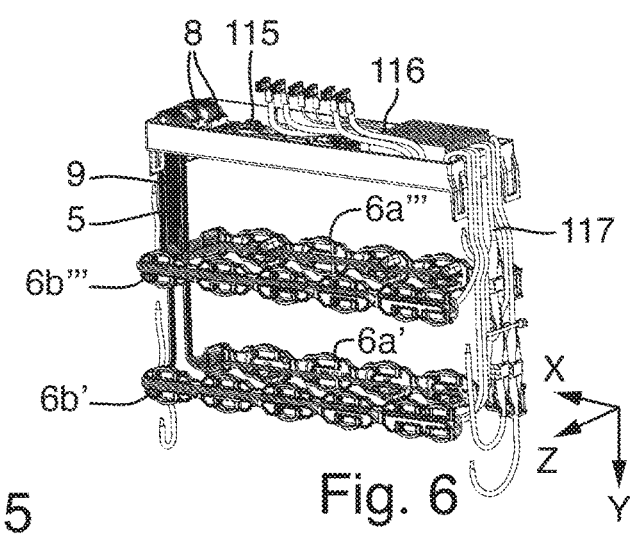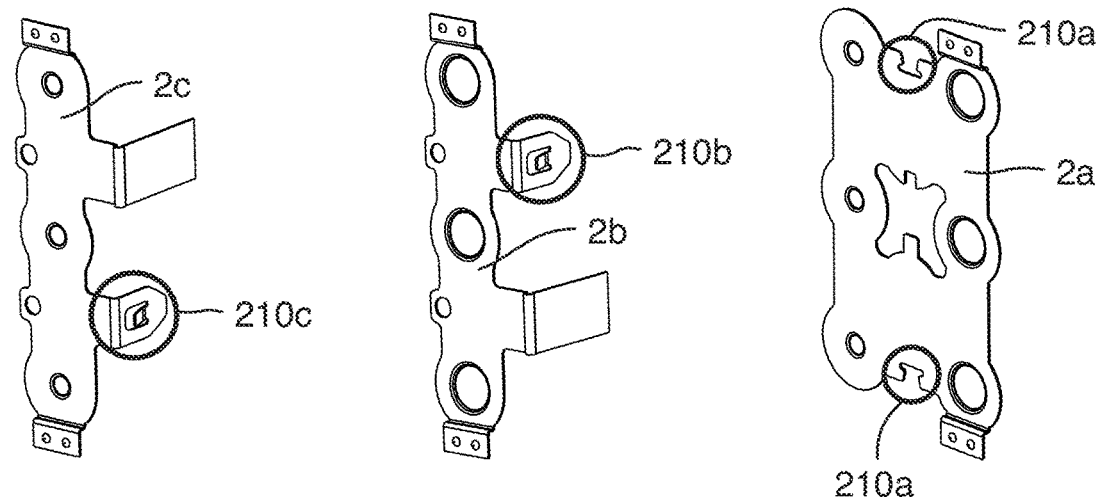

CELL CONNECTOR STRUCTURE, RECHARGEABLE BATTERY PACK AND GARDENING AND/OR FORESTRY WORK SYSTEM

CROSS REFERENCE TO RELATED APPLICATIONS

This application claims priority under 35 U.S.C. § 119 from European Patent Application No. 19150509.8, filed Jan. 7, 2019, the entire disclosure of which is herein expressly incorporated by reference.

This application contains subject matter related to U.S. application Ser. No. 16/723,282, entitled "Construction, Rechargeable Battery Pack, and Garden and/or Forest Tending System" and U.S. application Ser. No. 16/723,141, entitled "Rechargeable Battery Pack and Gardening and/or Forestry Work System," filed on even date herewith, the entire disclosures of which are herein incorporated by reference.

BACKGROUND AND SUMMARY OF THE INVENTION

The invention relates to a cell connector structure for a rechargeable battery pack for supplying electrical drive power to an electrically driven gardening and/or forestry work appliance, to a rechargeable battery pack having a cell connector structure of this kind and rechargeable battery cells, and to a gardening and/or forestry work system having a rechargeable battery pack of this kind and an electrically driven gardening and/or forestry work appliance.

It is an object of the invention to provide a cell connector structure for a rechargeable battery pack for supplying electrical drive power to an electrically driven gardening and/or forestry work appliance, wherein the cell connector structure allows good, in particular simple, assembly, a rechargeable battery pack having a cell connector structure of this kind and rechargeable battery cells, and a gardening and/or forestry work system having a rechargeable battery pack of this kind and an electrically driven gardening and/or forestry work appliance.

The invention achieves this and other objects by providing a cell connector structure, a rechargeable battery pack, and a gardening and/or forestry work system, according to the claimed invention.

The cell connector structure according to the invention is designed or configured for a rechargeable battery pack for supplying electrical drive power to an electrically driven gardening and/or forestry work appliance. The cell connector structure has a plurality of cell connectors, at least one cell connector element, in particular a cell connector preassembly element, a plurality of voltage tap elements, in particular medium-voltage tap elements, and at least one tap element body, in particular a tap element preassembly body. The cell connectors are designed or configured for electrically connecting, in particular a plurality of, rechargeable battery cells, in particular to one another. Furthermore, the cell connectors and the at least one cell connector element are designed or configured for being, in particular directly, arranged on one another and for being, in particular directly, secured against becoming detached from one another, in particular during or after being arranged on one another. The voltage tap elements have voltage tap cables. The voltage tap cables are designed or configured for being, in particular directly or indirectly, electrically connected to the cell connectors. Also, the voltage tap elements and the at least one tap element body are designed or configured for being, in particular directly, arranged on one another and for being, in particular directly, secured against becoming detached from one another, in particular during or after being arranged on one another. The at least one cell connector element with the cell connectors, which are in particular arranged and secured or premounted, and the at least one tap element body with the voltage tap elements, which are in particular arranged and secured or premounted, are designed or configured for being, in particular directly, mechanically connected to one another.

This, in particular the subdivision of the cell connector structure into the above-described components which are separate before assembly in particular, allows simple assembly of the cell connector structure. In particular, the cell connector structure does not have to be assembled in complex steps. For example, the cell connectors and the medium-voltage tap elements do not have to be directly arranged and secured or mounted either on the at least one cell connector element or the at least one tap element body. In particular, the cell connectors and the at least one tap element body do not have to be designed for being, in particular directly, arranged on one another and for being, in particular directly, secured against becoming detached from one another. In addition or as an alternative, the voltage tap elements and the at least one cell connector element do not need to be designed for being, in particular directly, arranged on one another and for being, in particular directly, secured against becoming detached from one another.

In addition or as an alternative, this, in particular the subdivision of the cell connector structure into the above-described components which are separate before assembly in particular, allows a high degree of automation when assembling the cell connector structure.

Further in addition or as an alternative, arranging and securing or premounting the cell connectors on the at least one cell connector element and/or the voltage tap elements on the at least one tap element body allows, in particular automatic, checking for correctness, in particular before mechanically connecting the at least one cell connector element to the cell connectors and the at least one tap element body to the voltage tap elements and therefore in a non-critical mounting state.

Further in addition or as an alternative, in the event of a fault, this, in particular securing the cell connectors to the at least one cell connector element and/or the voltage tap elements to the at least one tap element body, allows, in particular after mechanically connecting the at least one cell connector element to the cell connectors and the at least one tap element body to the voltage tap elements, a cell connector which is affected by the fault and/or a voltage tap element which is affected by the fault to not be able to move anywhere critical. This can allow a critical state caused by a, in particular the, fault in the cell connector structure to be avoided.

In particular, the at least one cell connector element can be designed for, in particular directly, receiving, in particular a plurality of, the cell connectors, in particular completely, and for, in particular directly, securing the received cell connectors against becoming detached from the cell connector element.

In addition or as an alternative, the at least one tap element body can be designed for, in particular directly, receiving, in particular a plurality of, the voltage tap elements, in particular partially or in sections, and for, in particular directly, securing the received voltage tap elements against becoming detached from the tap element body.

Further in addition or as an alternative, the at least one cell connector element can be designed for, in particular directly, receiving the at least one tap element body and for, in particular directly, securing the received tap element body against becoming detached from the cell holder element.

Further in addition or as an alternative, the cell connectors can, in particular in each case, be designed for connecting rechargeable battery cells electrically in series and/or in parallel.

Further in addition or as an alternative, in particular in each case, one or more of the cell connectors and one or more of the voltage tap elements, in particular voltage tap cables, can be associated with one another.

Further in addition or as an alternative, the voltage tap cables for being electrically connected to the cell connectors can have cable ends which are stripped of insulation. In addition or as an alternative, the voltage tap elements can have contact elements, which, in particular electrically, adjoin the voltage tap cables, for being electrically connected to the cell connectors.

Further in addition or as an alternative, the voltage tap cables can be, in particular automatically, electrically connected to the cell connectors by mechanically connecting the at least one cell connector element and the at least one tap element body to one another. In particular, the voltage tap cables and/or the contact elements, if present, can make electrical contact with the cell connectors, in particular by physical contact.

Further in addition or as an alternative, the at least one tap element body can be dimensionally stable or rigid, in particular in comparison to the voltage tap cables. In addition or as an alternative, the tap element body can be referred to as a strip.

Further in addition or as an alternative, the cell connectors and/or the at least one cell connector element and/or the voltage tap elements and/or the at least one tap element body can be different.

In a development of the invention, the cell connectors and the at least one cell connector element are designed or configured for positioning the cell connectors on the at least one cell connector element in a spatially separated manner and for securing the position of the positioned cell connectors. In addition or as an alternative, the voltage tap elements, in particular the contact elements, if present, and the at least one tap element body are designed or configured for positioning the voltage tap elements, in particular the contact elements, if present, on the at least one tap element body in a spatially separated manner and for securing the position of the positioned voltage tap elements, in particular the contact elements, if present. This allows electrical connection of different rechargeable battery cells. In addition or as an alternative, this allows the cell connectors and the voltage tap elements, in particular voltage tap cables and/or contact elements, if present, to be associated with one another, in particular when or after the at least one cell connector element and the at least one tap element body are mechanically connected. In particular, the at least one cell connector element can be designed for positioning the cell connectors in a spatially separated manner and for securing the position of the positioned cell connectors. In addition or as an alternative, the at least one tap element body can be designed for positioning the voltage tap elements in a spatially separated manner and for securing the position of the positioned voltage tap elements.

In a development of the invention, cable ends of the voltage tap cables are arranged spatially fixedly in relation to one another, in particular by means of at least one plug-in connector, and/or wherein the voltage tap cables, in part or completely, form at least one, in particular colour-coded, flat ribbon cable. This allows, in particular automatic, checking for correctness, in particular of the arrangement of the voltage tap elements, in particular the contact elements, if present, on the at least one tap element body. In other words: the cable ends can be bundled, in particular to form a cable harness. In particular, the cable ends can be situated opposite to or averted from the cable ends, which are stripped of insulation, and/or the contact elements, if present, and/or, when the at least one cell connector element and the at least one tap element body are mechanically connected, the cell connectors.

In a development of the invention, the cell connector structure has a front-side cell connector element, a rear-side cell connector element, at least one front-side tap element body and at least one rear-side tap element body. The front-side cell connector element and the at least one front-side tap element body are designed or configured for being, in particular directly, mechanically connected to one another. The rear-side cell connector element and the at least one rear-side tap element body are designed or configured for being, in particular directly, mechanically connected to one another. Furthermore, the front-side cell connector element and the rear-side cell connector element are designed or configured or shaped differently for avoiding connection on the incorrect side. In addition or as an alternative, the at least one front-side tap element body and the at least one rear-side tap element body are designed or configured or shaped differently for avoiding connection on the incorrect side.

In addition or as an alternative, a voltage tap cable is designed or configured to be longer than another voltage tap cable, in particular either for avoiding incorrect arrangement of a removed voltage tap element, in particular contact element, if present, and a nearby voltage tap element, in particular contact element, if present, on the tap element body or for avoiding incorrect connection of a removed tap element body and a nearby tap element body to the cell connector element.

This allows the risk of incorrect assembly to be reduced or even avoided.

In particular, the front-side cell connector element and the at least one rear-side tap element body do not have to be designed for being, in particular directly, mechanically connected to one another. In addition or as an alternative, the rear-side cell connector element and the at least one front-side tap element body do not have to be designed for being, in particular directly, mechanically connected to one another.

In a development of the invention, the cell connectors are metal cell connector sheets.

In addition or as an alternative, the voltage tap elements have contact tongues.

This allows the cell connectors and/or the voltage tap elements to be produced in a simple manner and/or allows the electrical connection, in particular of the cell connectors and the voltage tap elements, in particular the voltage tap cables, to be established in a simple manner.

In particular, the contact elements, if present, can be contact tongues.

In a development of the invention, the cell connectors and/or the at least one cell connector element and/or the voltage tap elements and/or the at least one tap element body are/is designed or configured in such a way, in particular the tap element body has cutouts, in particular windows, for at least parts of the voltage tap elements, that, when or after the at least one cell connector element is mechanically connected to the cell connectors and the at least one tap element body is mechanically connected to the voltage tap elements, the voltage tap elements are arranged at least partially over, in particular on, the cell connectors in a direction from the outside to the inside, in particular of the cell holder structure and/or the cell connector element, and are accessible from the outside for a, in particular cohesive, connection, in particular a welded connection, to the cell connectors. This allows the electrical connection, in particular of the cell connectors and the voltage tap elements, in particular the voltage tap cables, to be established in a simple manner. In particular, the parts of the voltage tap elements can be the contact elements, if present.

In a development of the invention, the at least one cell connector element and/or the cell connectors are/is designed or configured for securing, in particular in an interlocking manner, the voltage tap elements, in particular the contact elements, if present, against becoming detached from the tap element body when or after the cell connector element is mechanically connected to the cell connectors and the tap element body is mechanically connected to the voltage tap elements. This allows additional securing. In other words: the voltage tap elements and the at least one tap element body can or do not have to be designed for being arranged on one another when or after the cell connector element and the tap element body, in particular without voltage tap elements, are mechanically connected. In addition or as an alternative, the cell connectors and the at least one cell connector element can or do not have to be designed for being arranged on one another when or after the cell connector element, in particular without cell connectors, and the tap element body are mechanically connected.

In a development of the invention, the at least one cell connector element is designed or configured for, in particular directly, holding, in particular a plurality of, rechargeable battery cells, in particular round cells, on at least one cell side, in particular a cell circumferential side. The cell connectors are secured on the cell connector element in the region of the rechargeable battery cells, in particular on a cell end side, when the rechargeable battery cells are held. In addition or as an alternative, the at least one tap element body is mechanically connected to the cell connector element in the region of the rechargeable battery cells, in particular on a cell end side, when the rechargeable battery cells are held. In particular, the cell connectors can make, in particular direct, electrical contact with the rechargeable battery cells, in particular by physical contact, when the rechargeable battery cells are held. In addition or as an alternative, the at least one cell connector element can be referred to as a cell holder element. Further in addition or as an alternative, the cell connector structure can be referred to as a cell holder structure.

In a development of the invention, the at least one cell connector element is designed or configured for arranging, in particular receiving, in particular a plurality of, rechargeable battery cells, in particular round cells, in a direction from the inside to the outside, in particular of the cell holder structure and/or of the cell connector element, on an inner side of the cell connector element. The at least one cell connector element is designed or configured for arranging, in particular receiving, the cell connectors and/or the at least one tap element body with the voltage tap elements in an, in particular opposite, direction from the outside to the inside, in particular of the cell holder structure and/or of the cell connector element, on an outer side of the cell connector element, which outer side is situated opposite to or averted from the inner side. This allows mounting of the rechargeable battery cells independently of mounting of the cell connectors and/or of the at least one tap element body.

In a development of the invention, the cell connectors are, in particular in each case, designed or configured in one piece and/or in an electrically conductive manner.

In addition or as an alternative, the at least one cell connector element is designed or configured in one piece and/or in an electrically insulating manner.

In addition or as an alternative, the voltage tap elements are, in particular in each case, designed or configured in one piece and/or in an electrically conductive manner.

In addition or as an alternative, the at least one tap element body is designed or configured in one piece and/or in an electrically insulating manner.

In a development of the invention, the cell connectors, in particular in each case, and the at least one cell connector element are designed or configured for being connected to one another in an interlocking manner, in particular with a snap action.

In addition or as an alternative, the voltage tap elements, in particular in each case, and the at least one tap element body are designed or configured for being connected to one another in an interlocking manner, in particular with a snap action.

In addition or as an alternative, the at least one cell connector element with the cell connectors and the at least one tap element body with the voltage tap elements are designed or configured for being connected to one another in an interlocking manner, in particular with a snap action.

This allows simple, in particular tool-free, assembly.

In a development of the invention, the cell connector structure has at least one further cable, in particular a temperature sensor cable. The at least one further cable and the at least one cell connector element are designed or configured for being arranged on one another. The at least one cell connector element and the at least one tap element body are designed or configured for securing, in particular in an interlocking manner, the provided at least one further cable against becoming detached from the cell connector element when or after the cell connector element and the tap element body are mechanically connected. In particular, the at least one cell connector element can be designed for, in particular directly, receiving the at least one further cable, in particular in part or in sections.

The rechargeable battery pack according to the invention for supplying electrical drive power to an electrically driven gardening and/or forestry work appliance has a, in particular the, cell connector structure as described above and, in particular, a plurality of rechargeable battery cells, in particular round cells.

In particular, the rechargeable battery pack can have a mass of at most 20 kilograms (kg), in particular of at most 10 kg, in particular of at most 5 kg. In addition or as an alternative, the rechargeable battery cells can each be electrochemical individual rechargeable storage elements for electrical energy. Further in addition or as an alternative, the rechargeable battery cells can be lithium-ion rechargeable battery cells. Further in addition or as an alternative, the rechargeable battery cells can be identical, in particular identical in respect of type and/or design. Further in addition or as an alternative, an, in particular respective, length of the round cells can be greater than an, in particular respective, diameter of the round cells. Further in addition or as an alternative, the cell connectors can be, in particular directly, electrically connected to the rechargeable battery cells, in particular by a cohesive connection, in particular a welded connection.

In a development of the invention, the rechargeable battery pack has a measurement electronics part. The measurement electronics part is designed or configured for being electrically connected to the rechargeable battery cells by means of the cell connectors and the voltage tap elements, in particular the voltage tap cables, for, in particular automatically, measuring voltages, in particular medium voltages, in particular voltage values, of the rechargeable battery cells. In particular, the measurement electronics part can have at least one further plug-in connector for being electrically connected, in particular, to the at least one plug-in connector, if present. In addition or as an alternative, the measurement electronics part can be designed or configured for, in particular automatically, disconnecting the rechargeable battery pack, in particular the supply of electrical drive power to the gardening and/or forestry work appliance, when an upper voltage limit value is exceeded and/or a lower voltage limit value is undershot by the measured voltage, in particular in the event of a problem.

The gardening and/or forestry work system according to the invention has an, in particular the, rechargeable battery pack as described above and an electrically driven gardening and/or forestry work appliance. The rechargeable battery pack and the electrically driven gardening and/or forestry work appliance are designed or configured for being electrically connected to one another for, in particular automatically, supplying electrical drive power from the rechargeable battery pack to the electrically driven gardening and/or forestry work appliance.

In particular, the gardening and/or forestry work appliance can have an electric drive motor. In addition or as an alternative, the gardening and/or forestry work appliance can be a manually controlled, in particular hand-held or floor-based, gardening and/or forestry work appliance. In particular, manually controlled, in particular hand-held, gardening and/or forestry work appliance can mean that the gardening and/or forestry work appliance can have a mass of at most 50 kg, in particular of at most 20 kg, in particular of at most 10 kg. Further in addition or as an alternative, the rechargeable battery pack and the gardening and/or forestry work appliance can be designed or configured for being electrically connected to one another, in particular in a releasable manner, in particular without tools and/or without destruction, in particular by means of plug-in connectors. Further in addition or as an alternative, the rechargeable battery pack and the gardening and/or forestry work appliance can be designed or configured for being mechanically connected to one another, in particular in a releasable manner, in particular without tools and/or without destruction. In particular, the gardening and/or forestry work appliance can be designed or configured for carrying the rechargeable battery pack.

In a development of the invention, the gardening and/or forestry work system has a harness. The harness is designed or configured for carrying the rechargeable battery pack, in particular on a back of a user. In particular, the harness and the rechargeable battery pack can be designed or configured for being mechanically connected to one another, in particular in a detachable manner, in particular without tools and/or without destruction. In addition or as an alternative, the gardening and/or forestry work system, in particular the harness, can have an electrical connecting cable for electrically connecting the rechargeable battery pack and the gardening and/or forestry work appliance to one another.

In a development of the invention, the electrically driven gardening and/or forestry work appliance is a saw, a pole-mounted pruner, a brush cutter, a hedge trimmer, a hedge cutter, a blower, a leaf blower, a lopper, an angle grinder, a sweeping appliance, a sweeper roller, a sweeping brush, a lawnmower, a scarifier or a grass trimmer.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 5 shows a perspective view of at least one temperature sensor cable of the cell connector structure and a measurement electronics part of the rechargeable battery pack of FIG. 1.

FIG. 6 shows a perspective view of voltage tap elements, at least one tap element body, the at least one temperature sensor cable of the cell connector structure and the measurement electronics part of the rechargeable battery pack of FIG. 1.

FIG. 7 shows a perspective view of cell connectors of the cell connector structure of FIG. 1.

DETAILED DESCRIPTION OF THE DRAWINGS

Figure 1:
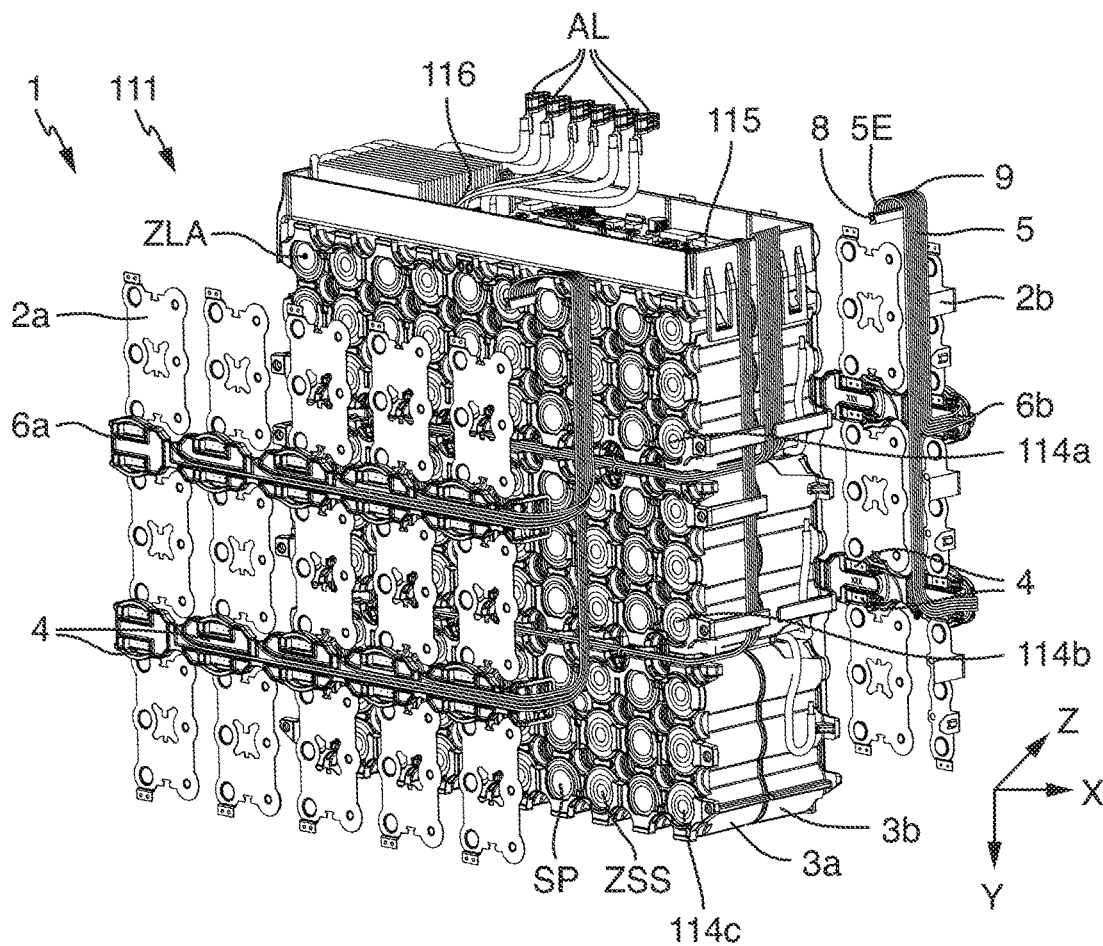
FIG. 1 shows a perspective exploded view of a rechargeable battery pack according to the invention having a cell connector structure according to the invention.

FIGS. 1 to 22 show a rechargeable battery pack 111 for supplying electrical drive power AL to an electrically driven gardening and/or forestry work appliance 101. The rechargeable battery pack 111 has a cell connector structure 1 and rechargeable battery cells 114a, 114b, 114c in the form of round cells.

The cell connector structure 1 is designed for the rechargeable battery pack 111 to supply electrical drive power AL to the electrically driven gardening and/or forestry work appliance 101. The cell connector structure 1 has a plurality of cell connectors 2a, 2b, 2c in the form of metal cell connector sheets, at least one cell connector element 3a, 3b, a plurality of voltage tap elements 4 and at least one tap element body 6a, 6b. The cell connectors 2a, 2b, 2c are designed for electrically connecting the rechargeable battery cells 114a, 114b, 114c. Furthermore, the cell connectors 2a, 2b, 2c and the at least one cell connector element 3a, 3b are designed for being arranged on one another and for being secured against becoming detached from one another. The voltage tap elements 4 have voltage tap cables 5. The voltage tap cables 5 are designed for being electrically connected to the cell connectors 2a, 2b, 2c. Also, the voltage tap elements 4 and the at least one tap element body 6a, 6b are designed for being arranged on one another and for being secured against becoming detached from one another. The at least one cell connector element 3a, 3b with the cell connectors 2a, 2b, 2c and the at least one tap element body 6a, 6b with the voltage tap elements 4 are designed for being mechanically connected to one another.

Figure 2:
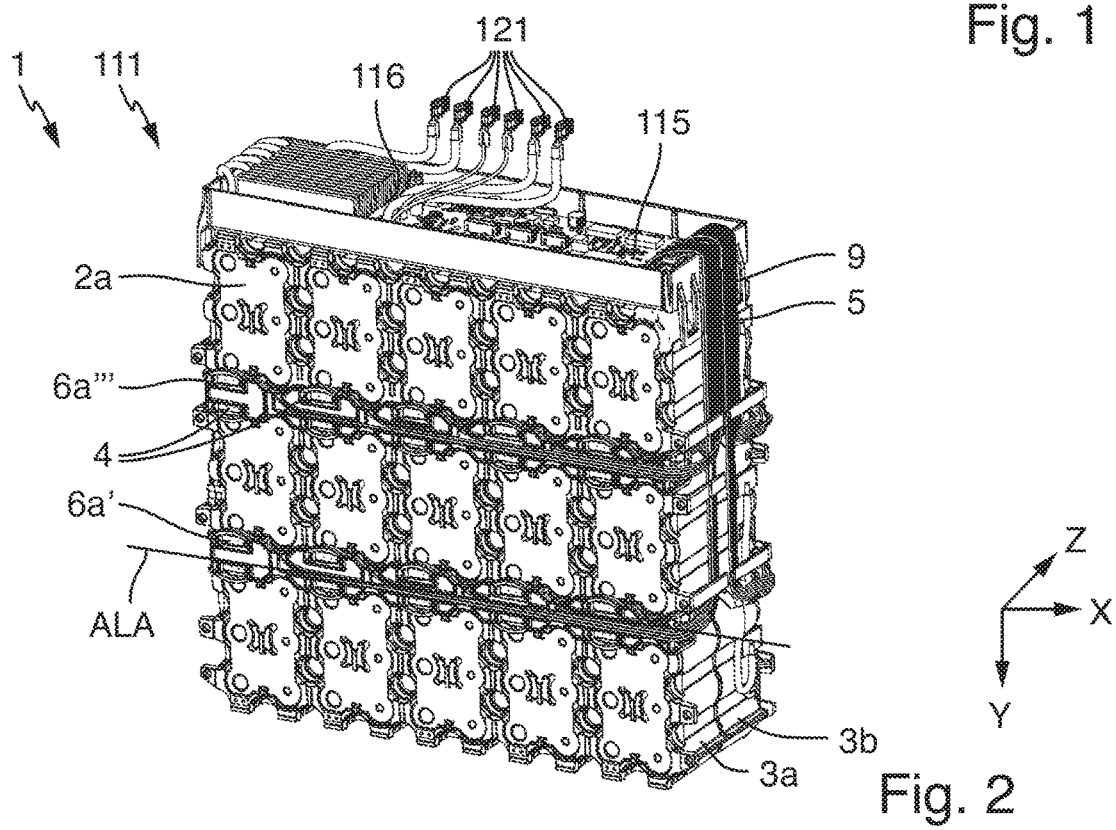
FIG. 2 shows a perspective view of a front side of the rechargeable battery pack having the cell connector structure of FIG. 1.
Figure 3:
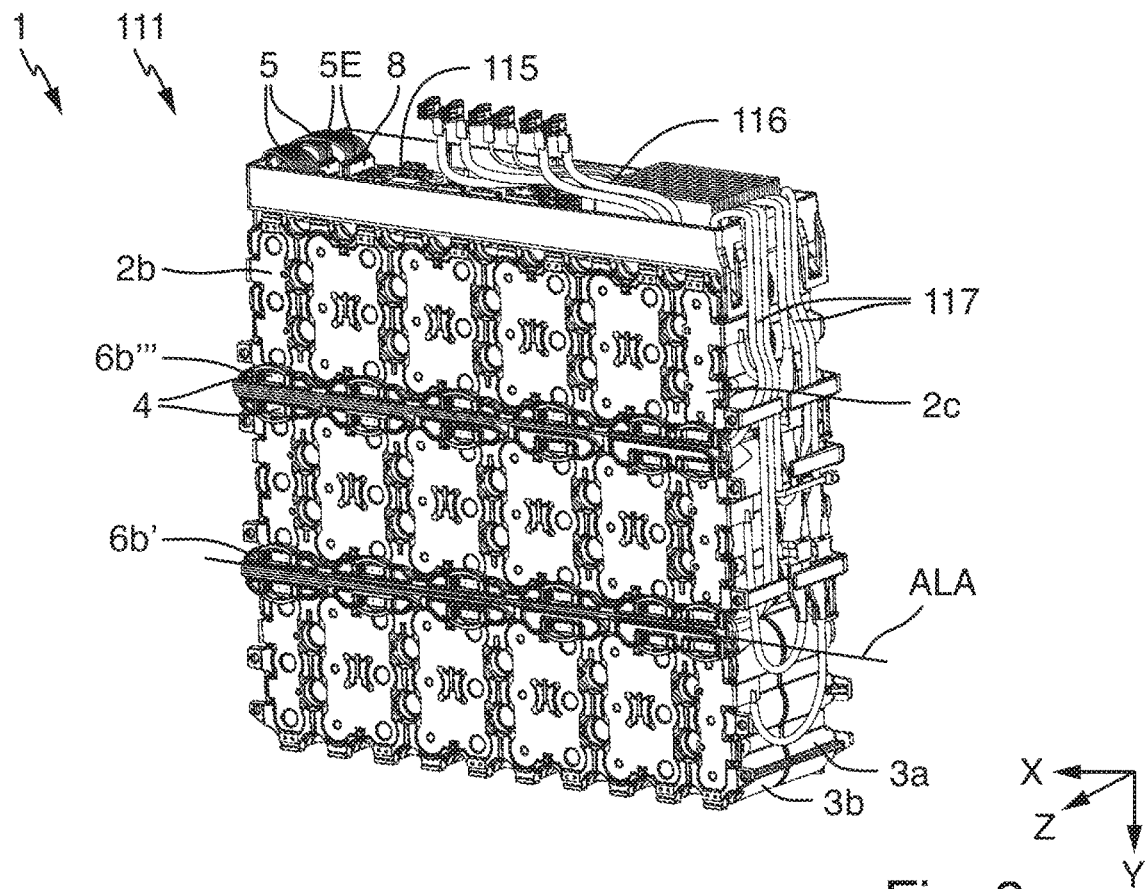
FIG. 3 shows a perspective view of a rear side of the rechargeable battery pack having the cell connector structure of FIG. 1.

In the exemplary embodiment shown, the cell connector structure 1 has thirty-three cell connectors 2a, 2b, 2c, as shown in FIGS. 2 and 3. In alternative exemplary embodiments, the cell connector structure can have at least two, in particular at least five, in particular at least ten, in particular at least twenty, in particular at least thirty, in particular at least forty, in particular at least fifty, cell connectors. Specifically, the cell connector structure 1 has fifteen plus twelve 6-way cell connectors 2a, in particular positive- and negative-pole cell connectors, as shown on the right-hand side in FIG. 7. Furthermore, the cell connector structure 1 has three 3-way cell connectors 2b, in particular negative-pole cell connectors, as shown in the middle in FIG. 7. Also, the cell connector structure 1 has three 3-way cell connectors 2c, in particular positive-pole cell connectors, as shown on the left-hand side in FIG. 7.

Figure 8:
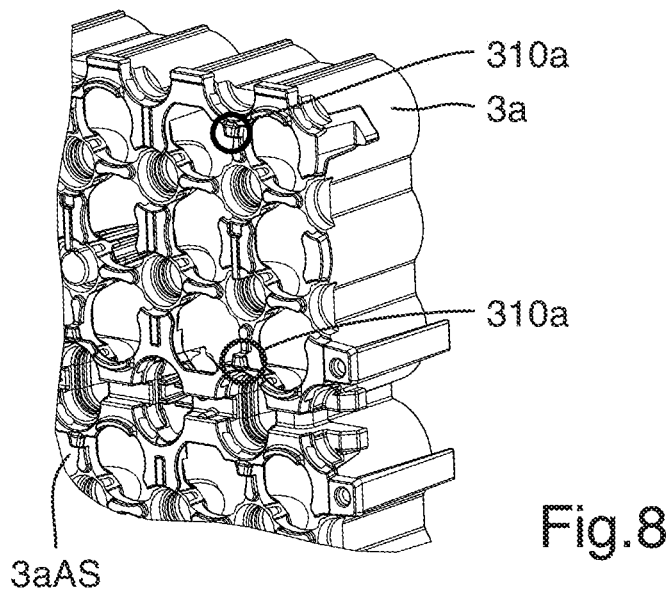
FIG. 8 shows a perspective view of a front-side cell connector element of the cell connector structure without cell connectors of FIG. 1.
Figure 9:
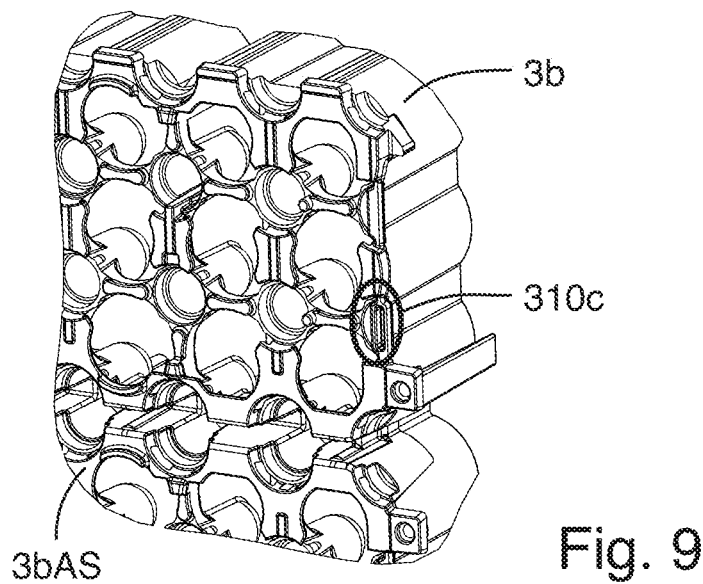
FIG. 9 shows a perspective view of a rear-side cell connector element of the cell connector structure without cell connectors of FIG. 1.

In the exemplary embodiment shown, the cell connector structure 1 further has two cell connector elements 3a, 3b, as shown in FIGS. 8 and 9. In alternative exemplary embodiments, the cell connector structure can have just one single cell connector element or at least three cell connector elements.

In FIGS. 2, 10, 12 and 19, fifteen cell connectors 2a and the cell connector element 3a are arranged on one another and secured. Furthermore, in FIGS. 3, 11, 13 and 19, the cell connectors 2a, 2b, 2c, in particular twelve cell connectors 2a, the three cell connectors 2b and the three cell connectors 2c, and the cell connector element 3b are arranged on one another and secured. In addition, the cell connector elements 3a, 3b are mechanically connected to one another in FIGS. 1 to 4 and 19. Also, the cell connectors 2a, 2b, 2c electrically connect the rechargeable battery cells 114a, 114b, 114c in FIGS. 2 to 4 and 19.

Furthermore, in the exemplary embodiment shown, the cell connector structure 1 has twenty-two voltage tap elements 4, as shown in FIGS. 2, 3, 6, 17 and 18. In alternative exemplary embodiments, the cell connector structure can have at least two, in particular at least five, in particular at least ten, in particular at least twenty, in particular at least thirty, in particular at least forty, in particular at least fifty, voltage tap elements. Specifically, the voltage tap elements 4 have contact elements 7, which adjoin the voltage tap cables 5, in the form of contact tongues for being electrically connected to the cell connectors 2a, 2b, 2c.

Also, in the exemplary embodiment shown, the cell connector structure 1 has four tap element bodies 6a, 6b, as shown in FIGS. 1 to 3 and 6. In alternative exemplary embodiments, the cell connector structure can have just one single, two, three or at least five tap element bodies.

In FIG. 2, in particular in each case, five voltage tap elements 4 and one of the tap element bodies 6a are arranged on one another and secured. Furthermore, in FIG. 3, in particular in each case, six voltage tap elements 4 and one of the tap element bodies 6b are arranged on one another and secured.

Figure 12:
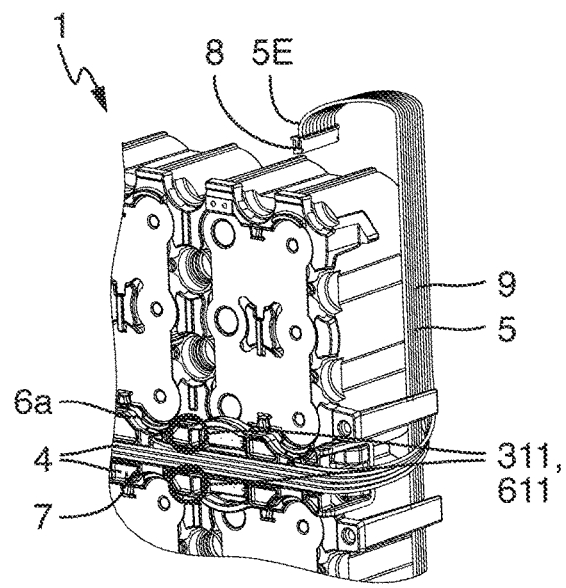
FIG. 12 shows a perspective view of the front-side cell connector element with cell connectors and the, in particular front-side, tap element body with voltage tap elements of the cell connector structure of FIG. 1.
Figure 19:
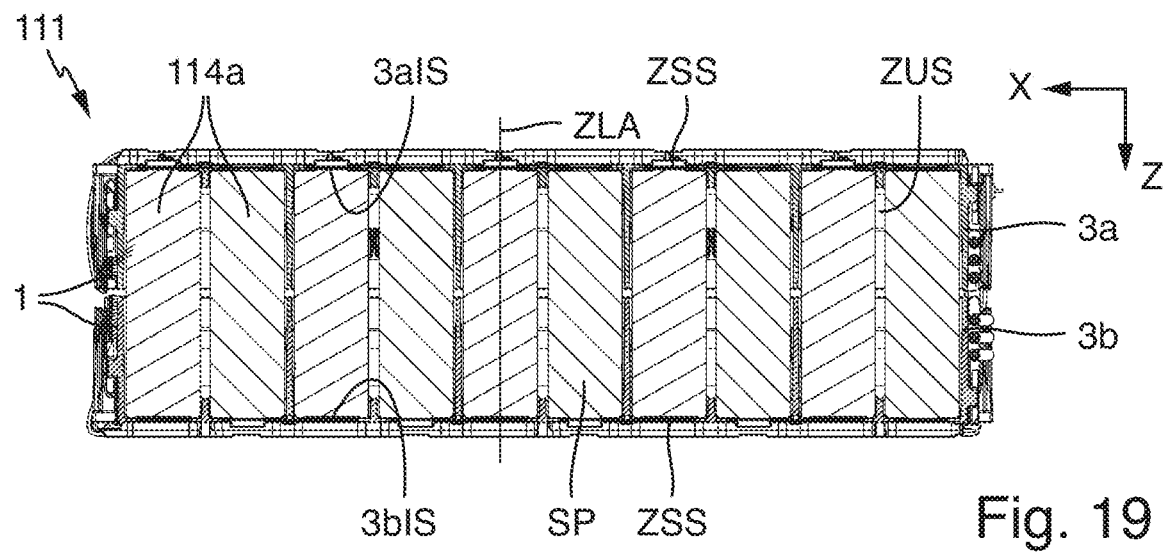
FIG. 19 shows a sectional view of the rechargeable battery pack of FIG. 1.

In addition, in FIGS. 2, 12 and 19, the cell connector element 3a with the cell connectors 2a and the tap element bodies 6a with the voltage tap elements 4 are mechanically connected to one another. Furthermore, in FIGS. 3, 13 and 19, the cell connector element 3b with the cell connectors 2a, 2b, 2c and the tap element bodies 6b with the voltage tap elements 4 are mechanically connected to one another. Also, the voltage tap cables 5 are electrically connected to the cell connectors 2a, 2b, 2c.

In addition, the at least one cell connector element 3a, 3b is, in the exemplary embodiment shown the cell connector elements 3a, 3b are, designed for holding the rechargeable battery cells 114a, 114b, 114c in the form of round cells on at least one cell side, in particular a cell circumferential side ZUS. In FIGS. 1 and 19, the at least one cell connector element 3a, 3b holds, in the exemplary embodiment shown the cell connector elements 3a, 3b hold, the rechargeable battery cells 114a, 114b, 114c, in particular in each case, on the at least one, in particular respective, cell circumferential side ZUS.

The cell connectors 2a, 2b, 2c are secured to the at least one cell connector element 3a, 3b, in the exemplary embodiment shown to the cell connector elements 3a, 3b, in the region of the rechargeable battery cells 114a, 114b, 114c, in particular on a, in particular respective, cell end side ZSS, as shown in FIGS. 1 and 19, when the rechargeable battery cells 114a, 114b, 114c are held.

In addition or as an alternative, the at least one tap element body 6a, 6b is, in the exemplary embodiment shown the tap element bodies 6a, 6b are, mechanically connected to the at least one cell connector element 3a, 3b, in the exemplary embodiment shown to the cell connector elements 3a, 3b, in the region of the rechargeable battery cells 114a, 114b, 114c when the rechargeable battery cells 114a, 114b, 114c are held, as shown in FIG. 19.

Furthermore, the cell connectors 2a, 2b, 2c and the at least one cell connector element 3a, 3b, in the exemplary embodiment shown the cell connector elements 3a, 3b, are designed for positioning the cell connectors 2a, 2b, 2c on the at least one cell connector element 3a, 3b, in the exemplary embodiment shown on the cell connector elements 3a, 3b, in a spatially separated manner and for securing the position of the positioned cell connectors 2a, 2b, 2c.

In addition or as an alternative, the voltage tap elements 4, in particular their contact elements 7, and the at least one tap element body 6a, 6b, in the exemplary embodiment shown the tap element bodies 6a, 6b, are designed for positioning the voltage tap elements 4, in particular the contact elements 7, on the at least one tap element body 6a, 6b, in the exemplary embodiment shown on the tap element bodies 6a, 6b, in a spatially separated manner and for securing the position of the positioned voltage tap elements 4, in particular the contact elements 7.

In the exemplary embodiment shown, at least some of the rechargeable battery cells 114a, 114b, 114c are arranged spatially in succession in a first direction x, as shown in FIGS. 1 and 19. Specifically, the rechargeable battery pack 111 has ten rechargeable battery cells 114a, 114b, 114c in the first direction x. In alternative exemplary embodiments, the rechargeable battery pack can have at least six rechargeable battery cells in the first direction. Furthermore, some of the rechargeable battery cells 114a, 114b, 114c are arranged spatially in succession in a second direction y which is non-parallel, in particular orthogonal, in relation to the first direction. Specifically, the rechargeable battery pack 111 has nine rechargeable battery cells 114a, 114b, 114c in the second direction y. In alternative exemplary embodiments, the rechargeable battery pack can have at least six and/or at most fifteen rechargeable battery cells in the second direction. Also, the rechargeable battery cells 114a, 114b, 114c in the form of the round cells are each spatially arranged with a round cell longitudinal axis ZLA non-parallel, in particular orthogonal, in relation to the first direction x and/or in relation to the second direction y and/or in a third direction z which is non-parallel, in particular orthogonal, in relation to the first and second directions.

Furthermore, in the exemplary embodiment shown, some of the cell connectors 2a, 2b, 2c are arranged spatially in succession in the first direction x. Specifically, five cell connectors 2a are arranged on the cell connector element 3a in the first direction x, as shown in FIG. 2. In alternative exemplary embodiments, at least two cell connectors can be arranged on the cell connector element in the first direction. In addition, six cell connectors 2a, 2b, 2c are arranged on the cell connector element 3b in the first direction x, as shown in FIG. 3. In alternative exemplary embodiments, at least three cell connectors can be arranged on the cell connector element in the first direction. Furthermore, in the exemplary embodiment shown, some of the cell connectors 2a, 2b, 2c are arranged spatially in succession in the second direction y. Specifically, three cell connectors 2a are arranged on the cell connector element 3a in the second direction y. In alternative exemplary embodiments, just one single cell connector or at least two cell connectors can be arranged on the cell connector element in the second direction. Also, three cell connectors 2a, 2b, 2c are arranged on the cell connector element 3b in the second direction y. In alternative exemplary embodiments, just one single cell connector or at least two cell connectors can be arranged on the cell connector element in the second direction.

Specifically, the cell connectors 2a, 2b, 2c electrically connect some of the rechargeable battery cells 114a, 114b, 114c, in the exemplary embodiment shown in three cell blocks, in series in the first direction x. Furthermore, the cell connectors 2a, 2b, 2c connect some of the rechargeable battery cells 114a, 114b, 114c, in the exemplary embodiment shown in the three cell blocks, electrically in parallel in the second direction y.

In the exemplary embodiment shown, a maximum electrical drive power MAL, in particular of the rechargeable battery pack 111, is at least 50 watts (W) and/or at most 5 kilowatts (kW).

In addition or as an alternative, a maximum potential MXP, in particular of the rechargeable battery pack 111, is at least 10 volts (V) and/or at most 500 V, in particular 42 V.

In addition or as an alternative, a maximum energy content MEI, in particular of the rechargeable battery pack 111, is at least 80 watt-hours (Wh) and/or at most 5 kilowatt-hours (kWh), in particular 1.5 kWh.

Specifically, in the cell block which is at the top in FIGS. 2 and 3 and in the cell block which is at the bottom in FIGS. 2 and 3, one of the cell connectors 2a, 2b, 2c and one of the voltage tap elements 4 are associated with one another or positioned in relation to one another, as can also be seen in FIGS. 6, 10 to 14, 17 and 18. Furthermore, in the cell block which is in the middle in FIGS. 2 and 3, one of the cell connectors 2a, 2b, 2c and two of the voltage tap elements 4 are associated with one another or positioned in relation to one another. In alternative exemplary embodiments, one or more of the cell connectors and one or more of the voltage tap elements can be associated with one another or positioned in relation to one another in a different way.

Also, in FIGS. 2 and 3, the tap element bodies 6a, 6b run between the cell connectors 2a, 2b, 2c, in particular in the first direction x. In other words: the tap element bodies 6a, 6b are, in particular each, spatially arranged with a, in particular respective, longitudinal axis ALA in the first direction x. In alternative exemplary embodiments, the tap element bodies can run in a different way or can be spatially arranged in a different way with the longitudinal axis, in particular in the second direction.

Furthermore, in the exemplary embodiment shown, the cell connector structure 1 is cuboidal. Specifically, the cell connector structure 1 has a length in the first direction x of 27 centimetres (cm). In alternative exemplary embodiments, the cell connector structure can have a length in the first direction of at least 10 cm and/or of at most 50 cm. Furthermore, the cell connector structure 1 has a width in the second direction y of 27 cm. In alternative exemplary embodiments, the cell connector structure can have a width in the second direction of at least 9 cm and/or of at most 60 cm. Also, the cell connector structure 1 has a height in the third direction z of 8 cm. In alternative exemplary embodiments, the cell connector structure can have a height in the third direction of at least 3 cm and/or of at most 20 cm.

Furthermore, cable ends 5E of the voltage tap cables 5 are arranged spatially fixedly in relation to one another, as shown in FIGS. 1 to 3, 6 and 12. In the exemplary embodiment shown, this is done by means of two plug-in connectors 8. In addition or as an alternative, the voltage tap cables 5 form two flat ribbon cables 9. In alternative exemplary embodiments, the cable ends can be arranged spatially fixedly in relation to one another by means of just one single plug-in connector or at least three plug-in connectors and/or the voltage tap cables can form just one single flat ribbon cable or at least three flat ribbon cables.

Furthermore, the cell connectors 2a, 2b, 2c are, in particular in each case, designed in one piece and/or in an electrically conductive manner, as shown in FIG. 7.

In addition or as an alternative, the at least one cell connector element 3a, 3b is, in the exemplary embodiment shown the cell connector elements 3a, 3b are, in particular in each case, designed in one piece and/or in an electrically insulating manner, as shown in FIGS. 8 and 9.

Figure 14:
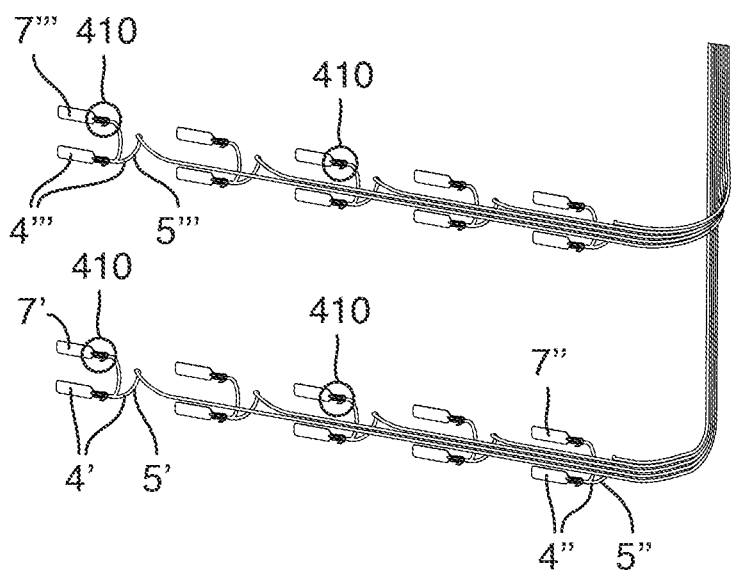
FIG. 14 shows a perspective view of the voltage tap elements of the cell connector structure of FIG. 1.

In addition or as an alternative, the voltage tap elements 4 are, in particular in each case, designed in one piece and/or in an electrically conductive manner, as shown in FIG. 14.

Figure 15:
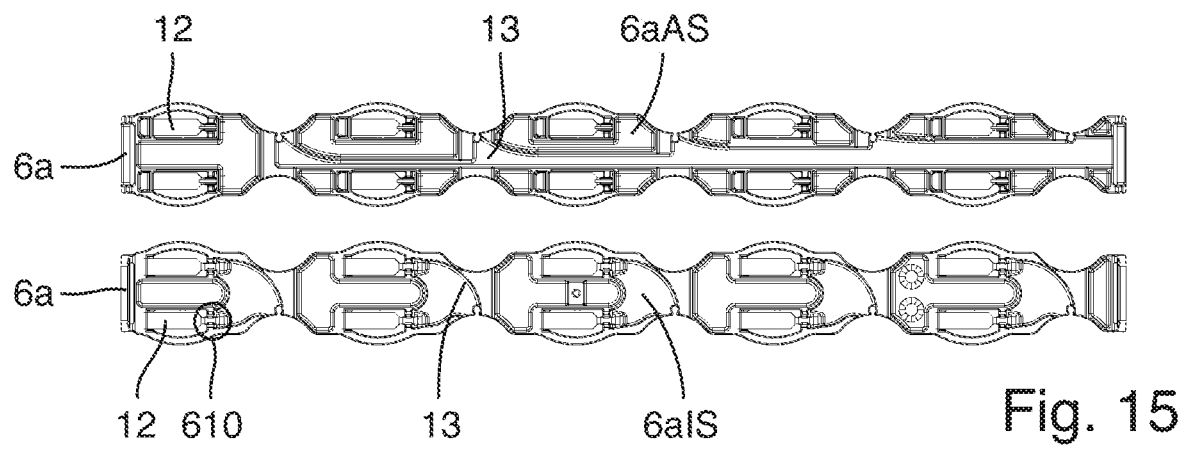
FIG. 15 shows a perspective view of an outer side and an inner side of the front-side tap element body without voltage tap elements of the cell connector structure of FIG. 1.
Figure 16:
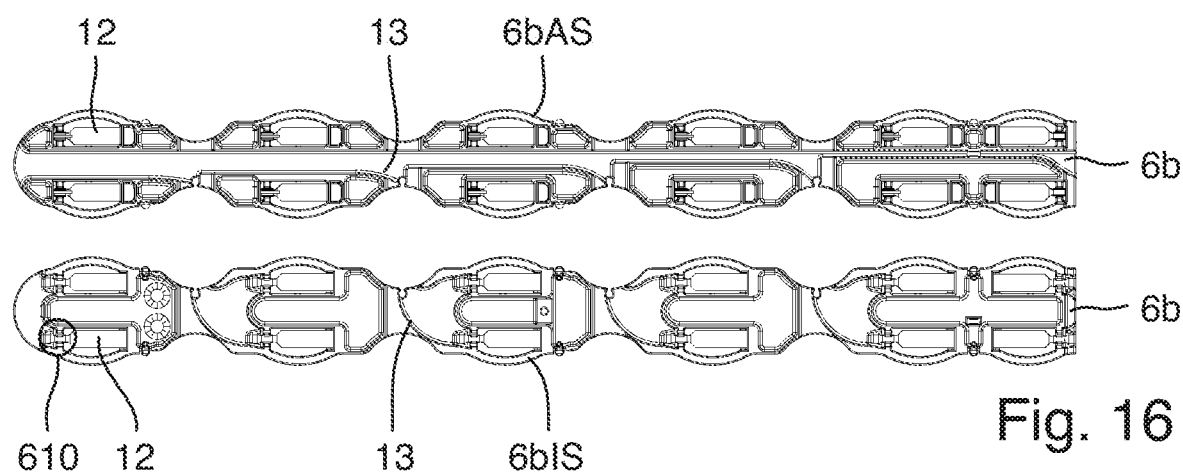
FIG. 16 shows a perspective view of an outer side and an inner side of the rear-side tap element body without voltage tap elements of the cell connector structure of FIG. 1.

In addition or as an alternative, the at least one tap element body 6a, 6b is, in the exemplary embodiment shown the tap element bodies 6a, 6b are, in particular in each case, designed in one piece and/or in an electrically insulating manner, as shown in FIGS. 15 and 16.

Also, the cell connectors 2a, 2b, 2c, in particular in each case, and the at least one cell connector element 3a, 3b, in the exemplary embodiment shown the cell connector elements 3a, 3b, are designed for being connected to one another in an interlocking manner, in particular with a snap action, as shown in FIGS. 7 to 11. Specifically, the cell connectors 2a, 2b, 2c, in particular in each case, have connecting elements 210a, 210b, 210c, in particular snap-action connecting elements. The at least one cell connector element 3a, 3b has, in the exemplary embodiment shown the cell connector elements 3a, 3b have, connecting elements 310a, 310b, 310c, in particular snap-action connecting elements.

In addition or as an alternative, the voltage tap elements 4, in particular the contact elements 7 in the form of the contact tongues, in particular in each case, and the at least one tap element body 6a, 6b, in the exemplary embodiment shown the tap element bodies 6a, 6b, are designed for being connected to one another in an interlocking manner, in particular with a snap action, as shown in FIGS. 14 to 18. Specifically, the voltage tap elements 4, in particular the contact elements 7 in the form of the contact tongues, in particular in each case, have connecting elements 410, in particular snap-action connecting elements. The at least one tap element body 6a, 6b has, in the exemplary embodiment shown the tap element bodies 6a, 6b have, in particular in each case, connecting elements 610, in particular snap-action connecting elements.

In addition or as an alternative, the at least one cell connector element 3a, 3b, in the exemplary embodiment shown the cell connector elements 3a, 3b, in particular in each case, with the cell connectors 2a, 2b, 2c and the at least one tap element body 6a, 6b, in the exemplary embodiment shown the tap element bodies 6a, 6b, in particular in each case, with the voltage tap elements 4 are designed for being connected to one another in an interlocking manner, in particular with a snap action, as shown in FIGS. 8 to 13 and 15 to 18. Specifically, the at least one cell connector element 3a, 3b has, in the exemplary embodiment shown the cell connector elements 3a, 3b, in particular in each case, connecting elements 311, in particular snap-action connecting elements. The at least one tap element body 6a, 6b has, in the exemplary embodiment shown the tap element bodies 6a, 6b have, in particular in each case, connecting elements 611, in particular snap-action connecting elements 611.

Figure 10:
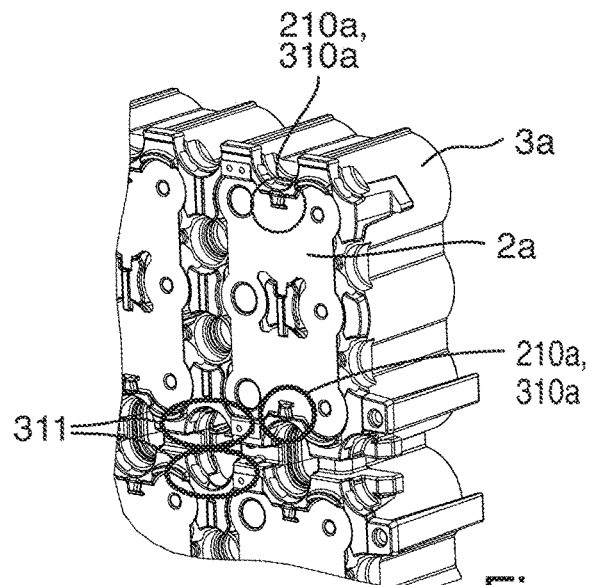
FIG. 10 shows a perspective view of the front-side cell connector element with cell connectors of the cell connector structure of FIG. 1.
Figure 11:
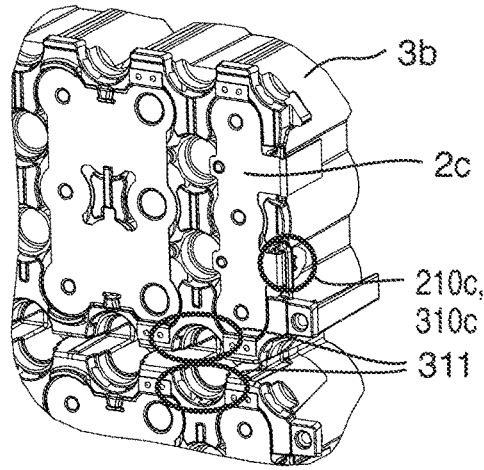
FIG. 11 shows a perspective view of the rear-side cell connector element with cell connectors of the cell connector structure of FIG. 1.
Figure 13:
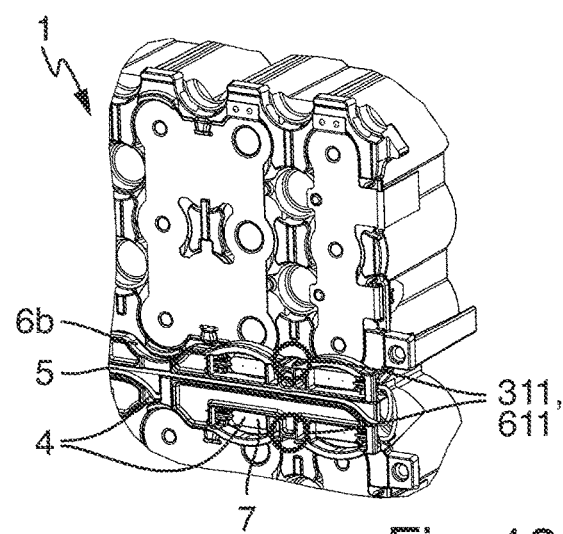
FIG. 13 shows a perspective view of the rear-side cell connector element with cell connectors and the, in particular rear-side, tap element body with voltage tap elements of the cell connector structure of FIG. 1.
Figure 17:
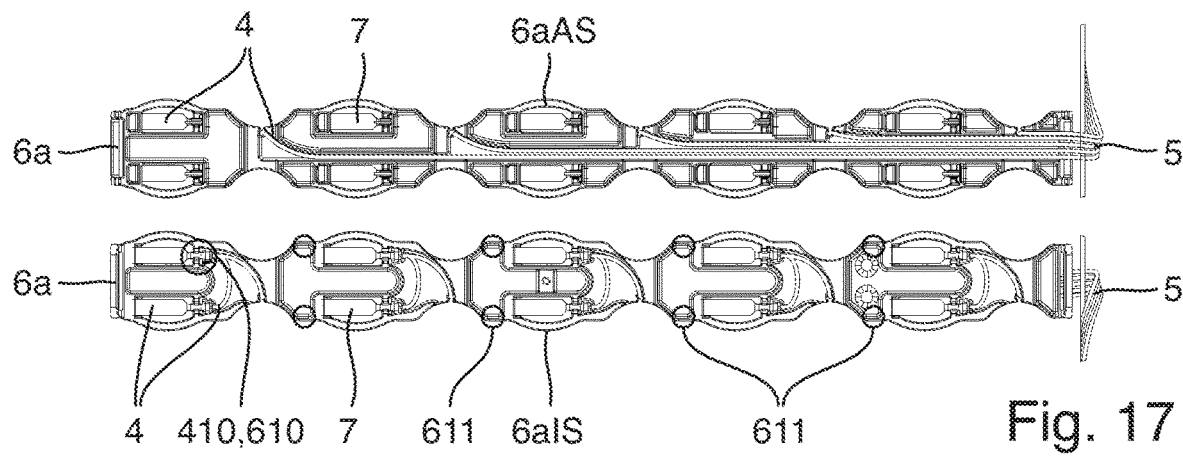
FIG. 17 shows a perspective view of the outer side and the inner side of the front-side tap element body with voltage tap elements of the cell connector structure of FIG. 1.
Figure 18:
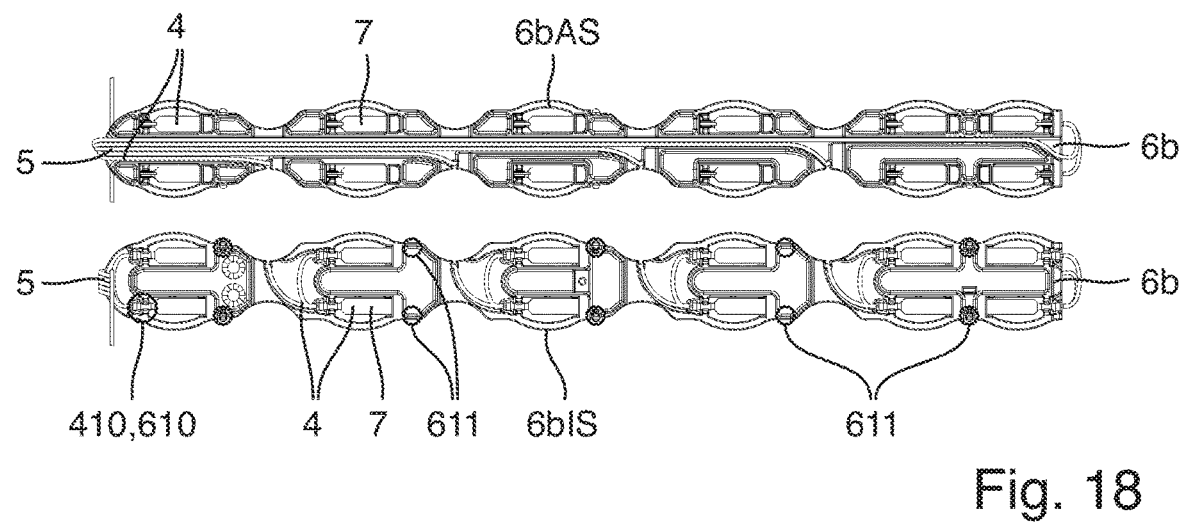
FIG. 18 shows a perspective view of the outer side and the inner side of the rear-side tap element body with voltage tap elements of the cell connector structure of FIG. 1.

Specifically, the cell connector structure 1 has a front-side cell connector element 3a, as shown in FIGS. 8, 10 and 12, a rear-side cell connector element 3b, as shown in FIGS. 9, 11 and 13, at least one front-side tap element body 6a, in the exemplary embodiment two, as shown in FIGS. 15 and 17, and at least one rear-side tap element body 6b, in the exemplary embodiment shown two, as shown in FIGS. 16 and 18. The front-side cell connector element 3a and the at least one front-side tap element body 6a, in the exemplary embodiment shown the front-side tap element bodies 6a, in particular in each case, are designed for being mechanically connected to one another. The rear-side cell connector element 3b and the at least one rear-side tap element body 6b, in the exemplary embodiment shown the rear-side tap element bodies 6b, in particular in each case, are designed for being mechanically connected to one another. Furthermore, the front-side cell connector element 3a and the rear-side cell connector element 3b are designed or shaped differently for avoiding connection on the incorrect side. In addition or as an alternative, the at least one front-side tap element body 6a, in the exemplary embodiment shown the front-side tap element bodies 6a, and the at least one rear-side tap element body 6b, in the exemplary embodiment shown the rear-side tap element bodies 6b, are designed or shaped differently for avoiding connection on the incorrect side.

In addition or as an alternative, a voltage tap cable 5' is designed to be longer than another voltage tap cable 5" for avoiding incorrect arrangement of a removed voltage tap element 4', in particular a removed contact element 7', and a nearby voltage tap element 4", in particular a nearby contact element 7", on the tap element body 6a, 6b, as shown in FIGS. 2, 3, 6 and 14. In addition or as an alternative, the voltage tap cable 5' is designed to be longer than another voltage tap cable 5' for avoiding incorrect connection of a removed tap element body 6a', 6b' and a nearby tap element body 6a", 6b''' to the cell connector element 3a, 3b, as shown in FIGS. 2, 3, 6 and 14.

In addition, the cell connectors 2a, 2b, 2c, in particular in each case, and/or the at least one cell connector element 3a, 3b, in particular in each case, and/or the voltage tap elements 4, in particular the contact elements 7, in particular in each case, and/or the at least one tap element body 6a, 6b, in particular in each case, are/is designed in such a way that, when the at least one cell connector element 3a, 3b is mechanically connected to the cell connectors 2a, 2b, 2c and the at least one tap element body 6a, 6b is mechanically connected to the voltage tap elements 4, in particular the contact elements 7, the voltage tap elements 4, in particular the contact elements 7, are arranged at least partially over the cell connectors 2a, 2b, 2c in a direction z, −z from the outside to the inside and are accessible from the outside for a, in particular cohesive, connection, in particular a welded connection, to the cell connectors 2a, 2b, 2c, as shown in FIGS. 10 to 18. Specifically, the tap element body 6a, 6b, in particular in each case, has cutouts 12, in particular windows, for at least some of the voltage tap elements 4, in particular the contact elements 7.

In addition, in the exemplary embodiment shown, the cell connectors 2a, 2b, 2c, in particular in each case, and/or the at least one cell connector element 3a, 3b, in particular in each case, and/or the voltage tap elements 4, in particular in each case, and/or the at least one tap element body 6a, 6b, in particular in each case, are/is designed in such a way that, when the at least one cell connector element 3a, 3b is mechanically connected to the cell connectors 2a, 2b, 2c and the at least one tap element body 6a, 6b is mechanically connected to the voltage tap elements 4, the cell connectors 2a, 2b, 2c are arranged at least partially over the rechargeable battery cells 114a, 114b, 114c in the direction z, −z from the outside to the inside and are accessible from the outside for a, in particular cohesive, connection, in particular a welded connection, to the rechargeable battery cells 114a, 114b, 114c, in particular poles of the rechargeable battery cells 114a, 114b, 114c on the at least one cell end side ZSS, as shown in FIGS. 1 to 3.

Furthermore, the at least one cell connector element 3a, 3b is, in the exemplary embodiment shown the cell connector elements 3a, 3b are, in particular in each case, designed for arranging the rechargeable battery cells 114a, 114b, 114c in the form of the round cells in the direction −z, z from the inside to the outside on an, in particular respective, inner side 3aIS, 3bIS of the cell connector element 3a, 3b, as shown in FIG. 19. The at least one cell connector element 3a, 3b is, in the exemplary embodiment shown the cell connector elements 3a, 3b are, designed for arranging the cell connectors 2a, 2b, 2c and/or the at least one tap element body 6a, 6b, in the exemplary embodiment shown the tap element bodies 6a, 6b, with the voltage tap elements 4 in the direction z, −z from the outside to the inside on an, in particular respective, outer side 3aAS, 3bAS of the cell connector element 3a, 3b, which outer side is situated opposite the inner side 3aIS, 3bIS, as shown in FIGS. 1 to 3 and 8 to 13.

Also, the at least one cell connector element 3a, 3b is, in the exemplary embodiment shown the cell connector elements 3a, 3b are, in particular in each case, and/or the cell connectors 2a, 2b, 2c are, in particular in each case, designed for securing, in particular in an interlocking manner, the voltage tap elements 4, in particular the contact elements 7, against becoming detached from the tap element body 6a, 6b when the cell connector element 3a, 3b is mechanically connected to the cell connectors 2a, 2b, 2c and the tap element body 6a, 6b is mechanically connected to the voltage tap elements 4, as shown in FIGS. 12, 13, 17 and 18. Specifically, the contact elements 7 in the form of the contact tongues are arranged on an, in particular respective, inner side 6aIS, 6bIS of the at least one tap element body 6a, 6b, in particular inserted into the tap element body 6a, 6b and clipped, as shown at the bottom in FIGS. 17 and 18. Furthermore, the at least one cell connector element 3a, 3b and the at least one tap element body 6a, 6b are designed for being mechanically connected to one another with the outer side 3aAS, 3bAS of the cell connector element 3a, 3b and the inner side 6aIS, 6bIS of the tap element body 6a, 6b facing one another, as shown in FIGS. 12 and 13.

In addition, in the exemplary embodiment shown, the voltage tap cables 5 are guided in the at least one tap element body 6a, 6b, in particular in cable guide ducts 13 of the at least one tap element body 6a, 6b, as shown in FIGS. 15 to 17. Specifically, the voltage tap cables 5 are guided from the, in particular respective, inner side 6aIS, 6bIS of the at least one tap element body 6a, 6b to an, in particular respective, outer side 6aAS, 6bAS of the at least one tap element body 6a, 6b, which outer side is situated opposite the inner side 6aIS, 6bIS, in particular angled and/or clamped for being secured against becoming detached from the tap element body 6a, 6b.

In addition, the at least one tap element body 6a, 6b is designed to be open in such a way that the voltage tap cables 5 can be arranged on said tap element body, in particular with the contact elements 7 in the form of the contact tongues, the at least one plug-in connector 8 and/or the at least one flat ribbon cable 9 formed.

Furthermore, the voltage tap cables 5 are fitted on, in particular in, the at least one cell connector element 3a, 3b, or laid over the at least one cell connector element 3a, 3b, as shown in FIG. 2.

Also, the rechargeable battery pack 111 has a measurement electronics part 115, as shown in FIGS. 1 to 6. The measurement electronics part 115 is designed for being electrically connected to the rechargeable battery cells 114a, 114b, 114c by means of the cell connectors 2a, 2b, 2c and the voltage tap elements 4, in particular the voltage tap cables 5, for measuring voltages SP, in particular medium voltages, from the rechargeable battery cells 114a, 114b, 114c. Specifically, the measurement electronics part 115 has at least one further plug-in connector for being electrically connected, in particular, to the at least one plug-in connector 8.

Figure 4:
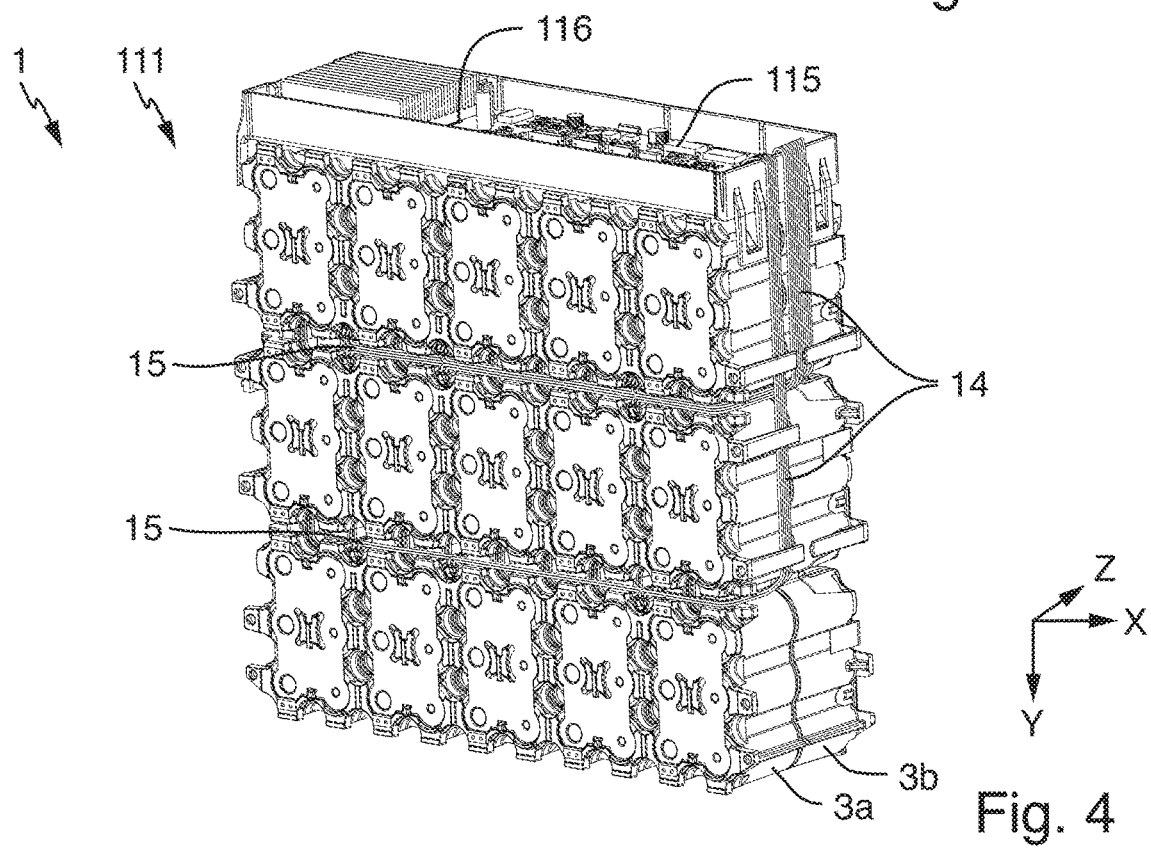
FIG. 4 shows a perspective view of the front side of the rechargeable battery pack having the cell connector structure without voltage tap elements and without tap element bodies of FIG. 1.

Furthermore, the cell connector structure 1 has at least one further cable 14, in particular a temperature sensor cable, in the exemplary embodiment shown further cables, as shown in FIGS. 4 to 6. The at least one further cable 14, in the exemplary embodiment shown the further cables 14, and the at least one, in particular front-side, cell connector element 3a are designed for being arranged on one another. The at least one, in particular front-side, cell connector element 3a and the at least one tap element body 6a, in the exemplary embodiment shown the tap element bodies 6a, are designed for securing, in particular in an interlocking manner, the provided at least one further cable 14, in the exemplary embodiment shown the further cables 14, against becoming detached from the cell connector element 3a when the cell connector element 3a and the tap element body 6a, in the exemplary embodiment shown the tap element bodies 6a, are mechanically connected. Specifically, the at least one, in particular front-side, cell connector element 3a has at least one cable channel 15, in the exemplary embodiment shown two cable channels 15, for receiving the at least one further cable 14, in the exemplary embodiment shown the further cables 14. In addition, in the exemplary embodiment shown, the at least one further cable 14, in the exemplary embodiment shown the further cables 14, are fitted on, in particular in, the at least one, in particular front-side, cell connector element 3a or laid over the at least one, in particular front-side, cell connector element 3a.

In addition, in the exemplary embodiment shown, the measurement electronics part 115 is designed for, in particular automatically, measuring temperatures, in particular temperature values, of the rechargeable battery cells 114a, 114b, 114c.

Furthermore, in the exemplary embodiment shown, the rechargeable battery pack 111 has a power electronics part 116, as shown in FIGS. 1 to 6. The power electronics part 116 is designed for being electrically connected to the rechargeable battery cells 114a, 114b, 114c by means of power lines 117, in particular which are different from the voltage tap cables 5 and/or the at least one further cable 14, and the cell connectors 2b, 2c. Specifically, the power lines 117 are fitted on, in particular in, the at least one cell connector element 3a, 3b or laid over the at least one cell connector element 3a, 3b.

Also, in the exemplary embodiment shown, the rechargeable battery pack 111 has plug-in connectors 121, in particular for electrically connecting the rechargeable battery pack 111 to the gardening and/or forestry work appliance 101, as shown in FIGS. 1 to 3.

Figure 20:
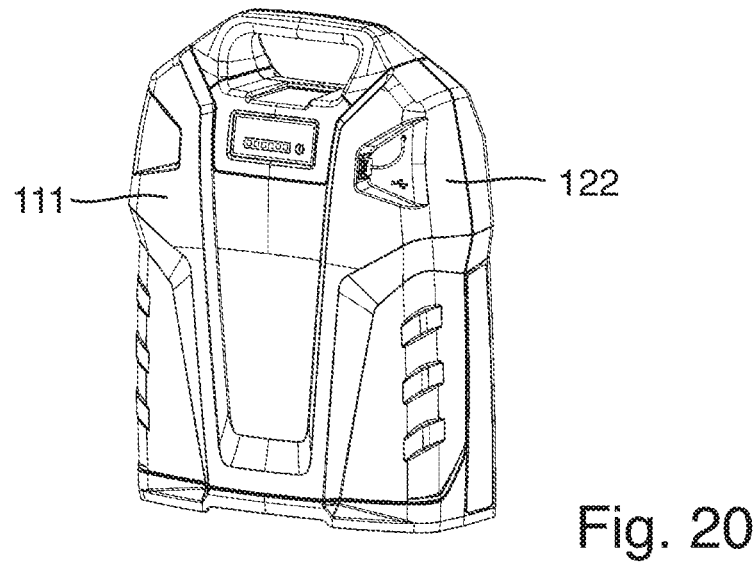
FIG. 20 shows a perspective view of the rechargeable battery pack having a housing of FIG. 1.

Furthermore, in the exemplary embodiment shown, the rechargeable battery pack 111 has a common housing 122, in particular protective housing, as shown in FIG. 20. The cell connector structure 1 and the rechargeable battery cells 114a, 114b, 114c are spatially arranged in the common housing 122. In addition, the measurement electronics part 115, the power electronics part 116, the power lines 117 and the plug-in connectors 121 are spatially arranged in the common housing 122.

Figure 21:
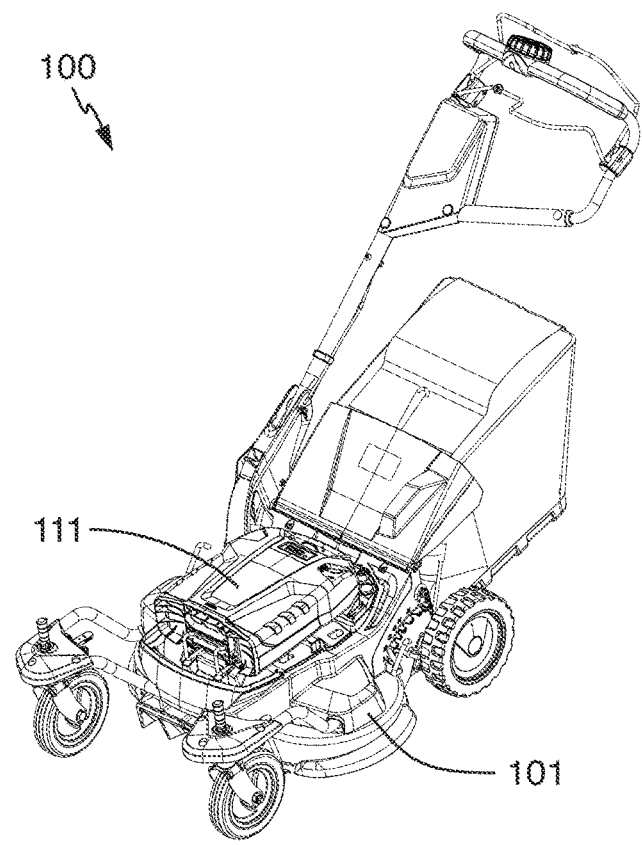
FIG. 21 shows a perspective view of a gardening and/or forestry work system according to the invention having the rechargeable battery pack of FIG. 1 and an electrically driven gardening and/or forestry work appliance in the form of a lawnmower.
Figure 22:
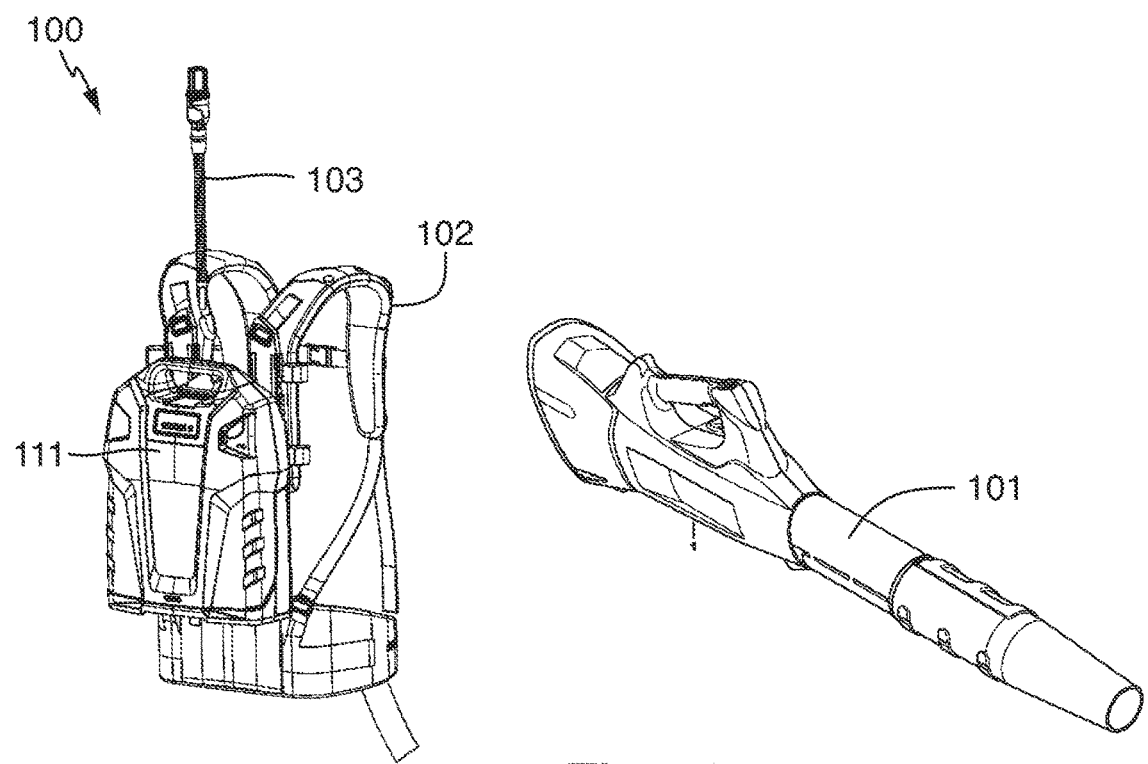
FIG. 22 shows a further perspective view of the gardening and/or forestry work system of FIG. 21 having a further electrically driven gardening and/or forestry work appliance in the form of a blower and a harness for carrying the rechargeable battery pack of FIG. 1.

FIGS. 21 and 22 show a gardening and/or forestry work system 100 according to the invention. The gardening and/or forestry work system 100 comprises the rechargeable battery pack 111 and the electrically driven gardening and/or forestry work appliance 101. The rechargeable battery pack 111 and the electrically driven gardening and/or forestry work appliance 101 are designed for being electrically connected to one another for supplying electrical drive power AL from the rechargeable battery pack 111 to the electrically driven gardening and/or forestry work appliance 101.

In the exemplary embodiment shown, the gardening and/or forestry work system 100 has two gardening and/or forestry work appliances 101. In alternative exemplary embodiments, the gardening and/or forestry work system can have just one single gardening and/or forestry work appliance or at least three gardening and/or forestry work appliances.

In FIG. 21, the gardening and/or forestry work appliance 101 is a lawnmower. In FIG. 22, the gardening and/or forestry work appliance 101 is a blower. In alternative exemplary embodiments, the gardening and/or forestry work appliance can be a saw, a pole-mounted pruner, a brush cutter, a hedge trimmer, a hedge cutter, a leaf blower, a lopper, an angle grinder, a sweeping appliance, a sweeper roller, a sweeping brush, a scarifier or a grass trimmer.

The lawnmower 101 is designed for carrying the rechargeable battery pack 111.

Furthermore, the gardening and/or forestry work system 100 has a harness 102. The harness 102 is designed for carrying the rechargeable battery pack 111.

In addition, the gardening and/or forestry work system 100, in particular the harness 102, has an electrical connecting cable 103 for electrically connecting the rechargeable battery pack 111 and the gardening and/or forestry work appliance 101, in FIG. 22 the blower, to one another.

As is clear from the exemplary embodiments shown and explained above, the invention provides a cell connector structure for a rechargeable battery pack for supplying electrical drive power to an electrically driven gardening and/or forestry work appliance, wherein the cell connector structure allows good, in particular simple, assembly, a rechargeable battery pack having a cell connector structure of this kind and rechargeable battery cells, and a gardening and/or forestry work system having a rechargeable battery pack of this kind and an electrically driven gardening and/or forestry work appliance.

The cell connector structure and/or the rechargeable battery pack can for example be designed, in particular the voltage tap cables, the at least one further cable, the rechargeable battery cells, the measurement electronics part, the power electronics part and/or the power lines can for example be designed, in particular spatially arranged, as disclosed in the Applicant's European patent applications 19150504.9 and 19150519.7 which were filed contemporaneously and the content of which is hereby fully incorporated in the disclosure of the present application by reference.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cell connector structure for a rechargeable battery pack that supplies electrical drive power to an electrically driven gardening and/or forestry work appliance, comprising:
   a plurality of cell connectors, wherein the cell connectors are designed for electrically connecting rechargeable battery cells;
   at least one cell connector element, wherein the cell connectors and the at least one cell connector element are designed for being arranged on one another and for being secured against becoming detached from one another;
   a plurality of voltage tap elements, wherein the voltage tap elements have voltage tap cables, wherein the voltage tap cables are designed for being electrically connected to the cell connectors; and
   at least one tap element body not integrally formed with the plurality of voltage tap elements and the voltage tap cables, wherein the voltage tap elements and the at least one tap element body are designed for being arranged on one another in a direction perpendicular to a plane containing the plurality of cell connectors, and for being secured against becoming detached from one another, and further wherein the voltage tap cables are arranged over an outer side of the at least one tap element body facing away from the plane containing the plurality of cell connectors so as to be exposed outwardly,
   wherein the at least one cell connector element with the cell connectors and the at least one tap element body with the voltage tap elements are designed for being mechanically connected to one another, and
   wherein the voltage tap elements and the at least one tap element body are designed for being connected to one another in an interlocking manner with a snap action.

2. The cell connector structure according to claim 1, wherein at least one of:
   the cell connectors and the at least one cell connector element are designed for positioning the cell connectors on the at least one cell connector element in a spatially separated manner and for securing the position of the positioned cell connectors, and
   the voltage tap elements and the at least one tap element body are designed for positioning the voltage tap elements on the at least one tap element body in a spatially separated manner and for securing the position of the positioned voltage tap elements.

3. The cell connector structure according to claim 1, wherein
   cable ends of the voltage tap cables are arranged spatially fixedly in relation to one another.

4. The cell connector structure according to claim 3, wherein
   the voltage tap cables form, in part or completely, at least one flat ribbon cable.

5. The cell connector structure according to claim 1, wherein
   the voltage tap cables form, in part or completely, at least one flat ribbon cable.

6. The cell connector structure according to claim 1, wherein
the cell connector structure has a front-side cell connector element, a rear-side cell connector element, at least one front-side tap element body and at least one rear-side tap element body,
the front-side cell connector element and the at least one front-side tap element body are designed for being mechanically connected to one another,
the rear-side cell connector element and the at least one rear-side tap element body are designed for being mechanically connected to one another, and
the front-side cell connector element and the rear-side cell connector element are designed differently for avoiding connection on an incorrect side, and/or the at least one front-side tap element body and the at least one rear-side tap element body are designed differently for avoiding connection on the incorrect side.

7. The cell connector structure according to claim 1, wherein
a voltage tap cable is designed to be longer than another voltage tap cable for avoiding incorrect arrangement of a distant voltage tap element and a nearby voltage tap element on the tap element body or for avoiding incorrect connection of a distant tap element body and a nearby tap element body to the cell connector element.

8. The cell connector structure according to claim 1, wherein at least one of:
the cell connectors are metal cell connector sheets, and
the voltage tap elements have contact tongues.

9. The cell connector structure according to claim 1, wherein
the cell connectors, the at least one cell connector element, the voltage tap elements and/or the at least one tap element body are designed in such a way that, when the at least one cell connector element is mechanically connected to the cell connectors and the at least one tap element body is mechanically connected to the voltage tap elements, the voltage tap elements are arranged at least partially over the cell connectors in a direction from the outside to the inside and are accessible from the outside for a cohesive connection to the cell connectors.

10. The cell connector structure according to claim 9, wherein
the tap element body has cutouts for at least parts of the voltage tap elements, and
the cohesive connection is a welded connection.

11. The cell connector structure according to claim 1, wherein
the at least one cell connector element and/or the cell connectors are designed for securing in an interlocking manner the voltage tap elements against becoming detached from the tap element body when the cell connector element is mechanically connected to the cell connectors and the tap element body is mechanically connected to the voltage tap elements.

12. The cell connector structure according to claim 1, wherein
the at least one cell connector element is designed for holding rechargeable battery cells on at least one cell side, and further wherein at least one of:
the cell connectors are secured to the cell connector element in a region of the rechargeable battery cells when the rechargeable battery cells are held, and
the at least one tap element body is mechanically connected to the cell connector element in the region of the rechargeable battery cells when the rechargeable battery cells are held.

13. The cell connector structure according to claim 12, wherein
the battery cells are round battery cells and the at least one cell side is a cell circumferential side.

14. The cell connector structure according to claim 1, wherein
the at least one cell connector element is designed for arranging rechargeable battery cells in a direction from the inside to the outside on an inner side of the cell connector element, and
the at least one cell connector element is designed for arranging the cell connectors and/or the at least one tap element body with the voltage tap elements in a direction from the outside to the inside on an outer side of the cell connector element, which outer side is situated opposite the inner side.

15. The cell connector structure according to claim 1, wherein at least one of:
the cell connectors are designed in one piece and/or in an electrically conductive manner,
the at least one cell connector element is designed in one piece and/or in an electrically insulating manner,
the voltage tap elements are designed in one piece and/or in an electrically conductive manner, and
the at least one tap element body is designed in one piece and/or in an electrically insulating manner.

16. The cell connector structure according to claim 1, where in at least one of:
the cell connectors and the at least one cell connector element are designed for being connected to one another in an interlocking manner, and
the at least one cell connector element with the cell connectors and the at least one tap element body with the voltage tap elements are designed for being connected to one another in an interlocking manner.

17. The cell connector structure according to claim 1, wherein
the cell connector structure has at least one further temperature sensor cable,
the at least one further temperature sensor cable and the at least one cell connector element are designed for being arranged on one another, and
the at least one cell connector element and the at least one tap element body are designed for securing in an interlocking manner the provided at least one further temperature sensor cable against becoming detached from the cell connector element when the cell connector element and the tap element body are mechanically connected.

18. A rechargeable battery pack for supplying electrical drive power to an electrically driven gardening and/or forestry work appliance, comprising:
a cell connector structure according to claim 1; and
rechargeable battery cells.

19. The rechargeable battery pack according to claim 18, wherein
the rechargeable battery pack has a measurement electronics part, and
the measurement electronics part is designed for being electrically connected to the rechargeable battery cells by way of the cell connectors and the voltage tap elements for measuring voltages of the rechargeable battery cells.

20. A gardening and/or forestry work system, comprising:
a rechargeable battery pack according to claim 18; and
an electrically driven gardening and/or forestry work appliance,
wherein the rechargeable battery pack and the electrically driven gardening and/or forestry work appliance are designed for being electrically connected to one another for supplying electrical drive power from the rechargeable battery pack to the electrically driven gardening and/or forestry work appliance.

* * * * *